US012651390B2

(12) United States Patent
Sato et al.

(10) Patent No.: US 12,651,390 B2
(45) Date of Patent: Jun. 9, 2026

(54) IMAGE PROCESSING DEVICE, CONTROL METHOD, AND NON-TRANSITORY COMPUTER READABLE MEDIUM FOR GENERATING IMAGE OF OUTSIDE WORLD, AND HEAD-MOUNTED DISPLAY DEVICE INCLUDING IMAGE PROCESSING DEVICE FOR GENERATING IMAGE OF OUTSIDE WORLD

(71) Applicant: CANON KABUSHIKI KAISHA, Tokyo (JP)

(72) Inventors: Shogo Sato, Kanagawa (JP); Masayuki Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/989,884

(22) Filed: Dec. 20, 2024

(65) Prior Publication Data

US 2025/0124629 A1 Apr. 17, 2025

Related U.S. Application Data

(63) Continuation of application No. PCT/JP2023/014599, filed on Apr. 10, 2023.

(30) Foreign Application Priority Data

Jun. 28, 2022 (JP) ................................. 2022-103268

(51) Int. Cl.
| | |
|---|---|
| *G06T 11/60* | (2026.01) |
| *G06F 3/01* | (2006.01) |
| *G06T 11/10* | (2026.01) |

(52) U.S. Cl.
CPC .............. *G06T 11/60* (2013.01); *G06F 3/013* (2013.01); *G06T 11/10* (2026.01)

(58) Field of Classification Search
CPC ....... G06T 11/60; G06T 11/001; G06T 19/00; G06F 3/013; H04N 13/239; H04N 13/254;
(Continued)

(56) References Cited

U.S. PATENT DOCUMENTS

| | | | |
|---|---|---|---|
| 9,557,566 B2 | 1/2017 | Fujimaki | |
| 9,787,912 B2 | 10/2017 | Asano | |

(Continued)

FOREIGN PATENT DOCUMENTS

| | | |
|---|---|---|
| JP | 2013-186641 A | 9/2013 |
| JP | 2016-062593 A | 4/2016 |

(Continued)

OTHER PUBLICATIONS

Jul. 4, 2023 International Search Report in International Patent Appln. No. PCT/JP2023/014599.

*Primary Examiner* — Amit Chatly
(74) *Attorney, Agent, or Firm* — Venable LLP

(57) ABSTRACT

An image processing device according to the present invention is usable together with a head-mounted display device including a first image sensor configured to obtain distance information, a second image sensor different from the first image sensor, and a display, and includes: one or more processors and/or circuitry configured to execute a first acquisition processing to acquire a first image of an outside world captured by the first image sensor; execute a second acquisition processing to acquire a second image of the outside world captured by the second image sensor; and execute a generation processing to generate, on a basis of the distance information corresponding to the first image, an image of the outside world, which is a color image to be (Continued)

displayed on the display, by combining the first image which is a grayscale image, and the second image which is a color image.

21 Claims, 10 Drawing Sheets

(58) Field of Classification Search
CPC .. H04N 13/257; H04N 13/279; H04N 13/344; H04N 13/361; H04N 13/366; H04N 23/45; H04N 23/60; H04N 23/63; H04N 23/741
See application file for complete search history.

(56) References Cited

U.S. PATENT DOCUMENTS

| | | | | |
|---|---|---|---|---|
| 10,897,570 | B1* | 1/2021 | Robinson | .................. G06T 7/50 |
| 10,958,847 | B2 | 3/2021 | Sakamoto | |
| 11,106,042 | B2 | 8/2021 | Otsuka | |

| | | | | |
|---|---|---|---|---|
| 2013/0194389 | A1* | 8/2013 | Vaught | ............... G02B 27/0176 |
| | | | | 348/78 |
| 2013/0234914 | A1 | 9/2013 | Fujimaki | |
| 2014/0132735 | A1* | 5/2014 | Lee | ....................... H04N 23/698 |
| | | | | 348/47 |
| 2015/0092019 | A1 | 4/2015 | Asano | |
| 2015/0278996 | A1* | 10/2015 | Tsutsumi | ............. H04N 13/257 |
| | | | | 348/47 |
| 2016/0057334 | A1* | 2/2016 | Ninan | .................... H04N 25/58 |
| | | | | 348/43 |
| 2017/0092004 | A1 | 3/2017 | Nishizawa | |
| 2019/0243376 | A1* | 8/2019 | Davis | ..................... G06T 7/292 |
| 2020/0112662 | A1 | 4/2020 | Sakamoto | |
| 2020/0310128 | A1 | 10/2020 | Otsuka | |

FOREIGN PATENT DOCUMENTS

| | | | |
|---|---|---|---|
| JP | 2017-067876 | A | 4/2017 |
| JP | 2018-117309 | A | 7/2018 |
| JP | 2020-167659 | A | 10/2020 |
| WO | 2014/002415 | A1 | 1/2014 |
| WO | 2017/191703 | A1 | 11/2017 |

* cited by examiner

IMAGE PROCESSING DEVICE, CONTROL METHOD, AND NON-TRANSITORY COMPUTER READABLE MEDIUM FOR GENERATING IMAGE OF OUTSIDE WORLD, AND HEAD-MOUNTED DISPLAY DEVICE INCLUDING IMAGE PROCESSING DEVICE FOR GENERATING IMAGE OF OUTSIDE WORLD

CROSS-REFERENCE TO RELATED APPLICATIONS

This application is a Continuation of International Patent Application No. PCT/JP2023/014599, filed Apr. 10, 2023, which claims the benefit of Japanese Patent Application No. 2022-103268, filed Jun. 28, 2022, all of which are hereby incorporated by reference herein in their entirety.

BACKGROUND OF THE INVENTION

Field of the Invention

The present invention relates to an image processing device, a head-mounted display device, a control method of an image processing device, and a non-transitory computer-readable medium.

Background Art

A video see-through display device has been proposed as a head-mounted display device (for example, an HMD (head-mounted display)). A video see-through display device has an imaging unit and a display unit, and the imaging unit images the outside world (real space), while the display unit displays the image (image of the outside world) obtained by the imaging unit. Technology related to a video see-through display device is disclosed in, for example, PTL 1.

However, in a conventional head-mounted display device (video see-through method), a view different from the real view is provided to the user. For example, because the position of the imaging unit is different from the position of the user's eyes, a view different from the real view is provided to the user. In order to provide a view close to the real view to the user, it is also necessary to display a high-resolution color image. However, if a head-mounted display device is provided with two imaging units capable of obtaining high-resolution color images, with one of the two imaging units being provided for obtaining an image to be viewed by the right eye and the other of the two imaging units being provided for obtaining an image to be viewed by the left eye, the cost of the device will increase in accordance with an increased cost of the imaging units. Furthermore, since it becomes necessary to process two color images (high resolution) obtained by the two imaging units, the processing load increases, and expensive processors and memories are required.

The present invention provides a technology that can obtain an image suitable for display on a head-mounted display device.

CITATION LIST

Patent Literature

PTL 1 Japanese Patent Application Publication No. 2016-62593

SUMMARY OF THE INVENTION

The present invention in its first aspect provides an image processing device usable together with a head-mounted display device including a first image sensor configured to obtain distance information, a second image sensor different from the first image sensor, and a display, the image processing device including: one or more processors and/or circuitry configured to execute a first acquisition processing to acquire a first image of an outside world captured by the first image sensor; execute a second acquisition processing to acquire a second image of the outside world captured by the second image sensor; and execute a generation processing to generate, on a basis of the distance information corresponding to the first image, an image of the outside world, which is a color image to be displayed on the display, by combining the first image which is a grayscale image, and the second image which is a color image.

The present invention in its second aspect provides a head-mounted display device including: the first image sensor; the second image sensor; the display; and the above-mentioned image processing device.

The present invention in its third aspect provides a control method of an image processing device usable together with a head-mounted display device including a first image sensor configured to obtain distance information, a second image sensor different from the first image sensor, and a display, the control method including: acquiring a first image of an outside world captured by the first image sensor; acquiring a second image of the outside world captured by the second image sensor; and generating, on a basis of the distance information corresponding to the first image, an image of the outside world, which is a color image to be displayed on the display, by combining the first image which is a grayscale image, and the second image which is a color image.

The present invention in its fourth aspect provides a non-transitory computer readable medium that stores a program, wherein the program causes a computer to execute a control method of an image processing device usable together with a head-mounted display device including a first image sensor configured to obtain distance information, a second image sensor different from the first image sensor, and a display, the control method comprising: acquiring a first image of an outside world captured by the first image sensor; acquiring a second image of the outside world captured by the second image sensor; and generating, on a basis of the distance information corresponding to the first image, an image of the outside world, which is a color image to be displayed on the display, by combining the first image which is a grayscale image, and the second image which is a color image.

Further features of the present invention will become apparent from the following description of exemplary embodiments with reference to the attached drawings.

DESCRIPTION OF THE EMBODIMENTS

First Embodiment

The first embodiment of the present invention will be described. In the first embodiment, an example in which the present invention is applied to an HMD (head-mounted display) will be described, but the present invention can also be applied to other head-mounted display devices. For example, a handheld display device that a user holds in his/her hand and wears (places) on his/her head is a type of head-mounted display device, and the present invention is also applicable to the handheld display device. The present invention is also applicable to a head-mounted display device in which a user views an image with both eyes and to a head-mounted display device in which a user views an image with one eye. The present invention is also applicable to electronic devices other than the head-mounted display device as long as the electronic device can be used together with the head-mounted display device. An image processing device to which the present invention is applied may be provided in the head-mounted display device or in an electronic device separate from the head-mounted display device. For example, the present invention is also applicable to a controller or a personal computer (PC) connected to the HMD by wire or wirelessly. The HMD according to the first embodiment is a video see-through-type HMD and displays an image of the outside world (real space) by combining graphics (for example, virtual objects) as necessary.

Figure 1A:
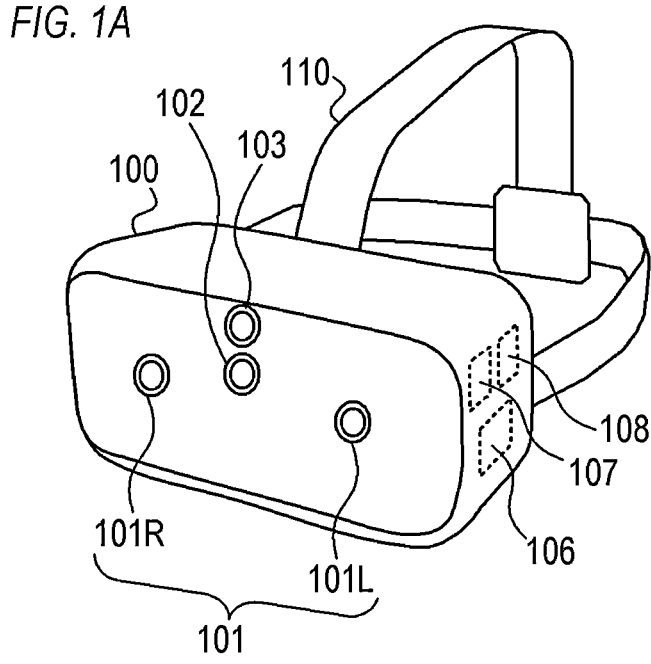
FIGS. 1A and 1B are external views of an HMD 100 according to a first embodiment.
Figure 1B:
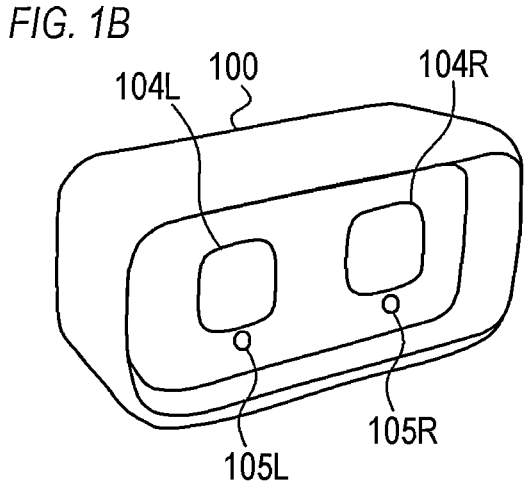

FIGS. 1A and 1B are external views of an HMD 100 according to the first embodiment. FIG. 1A is a front perspective view of the HMD 100, and FIG. 1B is a rear perspective view of the HMD 100. As shown in FIG. 1A, the HMD 100 is provided with a headband 110. The user places the HMD 100 in contact with the eyes and fixes it to the head with the headband 110. The HMD 100 has a stereo camera 101, a monocular camera 102, a projection unit 103, a left display unit 104L, a right display unit 104R, a left-eye imaging unit 105L, and a right-eye imaging unit 105R. The HMD 100 has a CPU (Central Processing Unit) 106, a ROM (Read Only Memory) 107, and a RAM (Random Access Memory) 108 therein.

The stereo camera 101 is a camera (imaging device) that images the outside world to obtain distance information and has a left imaging unit 101L and a right imaging unit 101R. Each of the left imaging unit 101L and the right imaging unit 101R is, for example, a global shutter-type imaging unit. The monocular camera 102 is an imaging device (imaging unit) that is oriented in the same direction as the stereo camera 101 and images the outside world. The monocular camera 102 is, for example, a rolling shutter-type imaging unit. From a certain perspective, the monocular camera 102 has higher performance than each of the left imaging unit 101L and the right imaging unit 101R. In the first embodiment, each of the left imaging unit 101L and the right imaging unit 101R is an imaging unit that images a grayscale image, and the monocular camera 102 is an imaging unit that images a color image. The projection unit 103 is oriented in the same direction as the stereo camera 101 and the monocular camera 102 and projects invisible light onto the imaging ranges of the stereo camera 101 and the monocular camera 102. In the first embodiment, the projection unit 103 is not used (an example of using the projection unit 103 will be described in the second embodiment).

The left display unit 104L is disposed so as to face the left eye of the user wearing the HMD 100 and displays an image to be viewed by the left eye of the user. The right display unit 104R is disposed so as to face the right eye of the user wearing the HMD 100 and displays an image to be viewed by the right eye of the user. The left-eye imaging unit 105L is disposed in association with the left display unit 104L and images the left eye that looks at the left display unit 104L. The right-eye imaging unit 105R is disposed in association with the right display unit 104R and images the right eye that looks at the right display unit 104R. In the first embodiment, the left-eye imaging unit 105L and the right-eye imaging unit 105R are not used (an example of using the left-eye imaging unit 105L and the right-eye imaging unit 105R will be described in the third embodiment).

The CPU 106 is an information processing device (image processing device) that controls the entire HMD 100. The ROM 107 stores various pieces of data (for example, various programs and various parameters). The RAM 108 also stores various pieces of data. For example, the CPU 106 loads a program stored in the ROM 107 into the RAM 108 and executes it.

Figure 2:
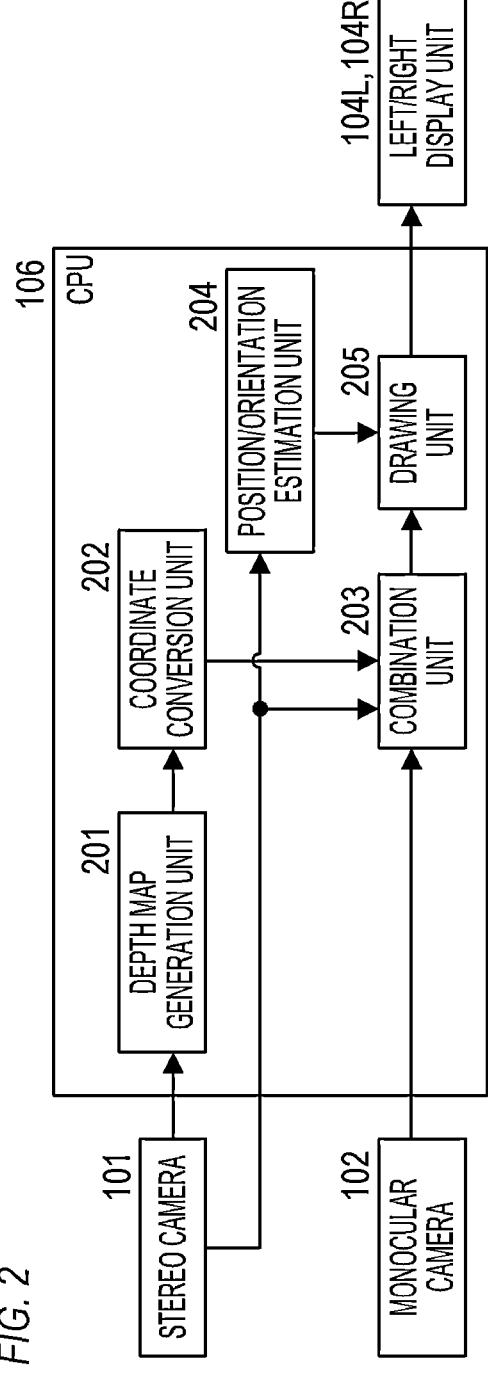
FIG. 2 is a block diagram showing the functional configuration of a CPU 106 according to the first embodiment.

FIG. 2 is a block diagram showing the functional configuration of the CPU 106 according to the first embodiment. In the first embodiment, the CPU 106 has a depth map generation unit 201, a coordinate conversion unit 202, a combination unit 203, a position/orientation estimation unit 204, and a drawing unit 205.

The depth map generation unit 201 acquires two grayscale images having a parallax from the stereo camera 101 (a grayscale image acquired by the left imaging unit 101L and a grayscale image acquired by the right imaging unit 101R). The depth map generation unit 201 then generates a depth map (distance map, depth information, and distance information) from the two acquired grayscale images. The depth map is information indicating the distribution of the depth (distance) from the stereo camera 101 to the object and is, for example, an image having a depth value as a pixel value.

Figure 3A:
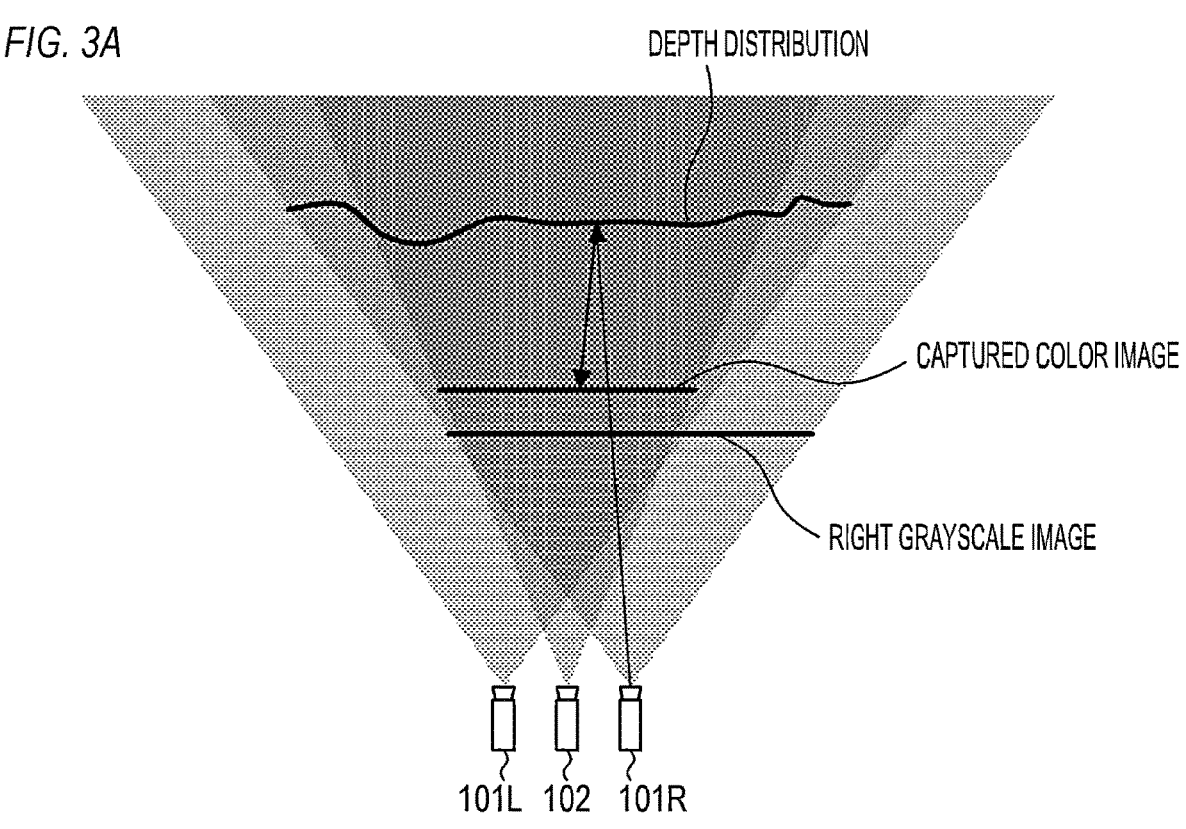
FIGS. 3A and 3B are diagrams showing the state of coordinate projection according to the first embodiment.

FIG. 3A shows an example of the distribution of the depth represented by the depth map. As shown in FIG. 3A, the depth map represents the distribution of the depth in the range where the imaging range of the left imaging unit 101L and the imaging range of the right imaging unit 101R overlap.

The coordinate conversion unit 202 converts the coordinates of the pixels of the grayscale image (left grayscale image) acquired by the left imaging unit 101L into the coordinates of the color image (captured color image) acquired by the monocular camera 102 based on the depth map generated by the depth map generation unit 201. This conversion can also be considered as "projection (coordinate projection) of the coordinates of the left grayscale image onto the captured color image". This allows the coordinates of the left grayscale image to be associated with the coordinates of the captured color image. Similarly, the coordinate conversion unit 202 projects the coordinates of the grayscale image (right grayscale image) acquired by the right imaging unit 101R onto the captured color image. This allows the coordinates of the right grayscale image to be associated with the coordinates of the captured color image. This coordinate projection is shown in FIG. 3A. FIG. 3A shows the state in which the coordinates of the right grayscale image are projected onto the captured color image. The coordinates of the left grayscale image are similarly projected onto the captured color image.

Figure 3B:
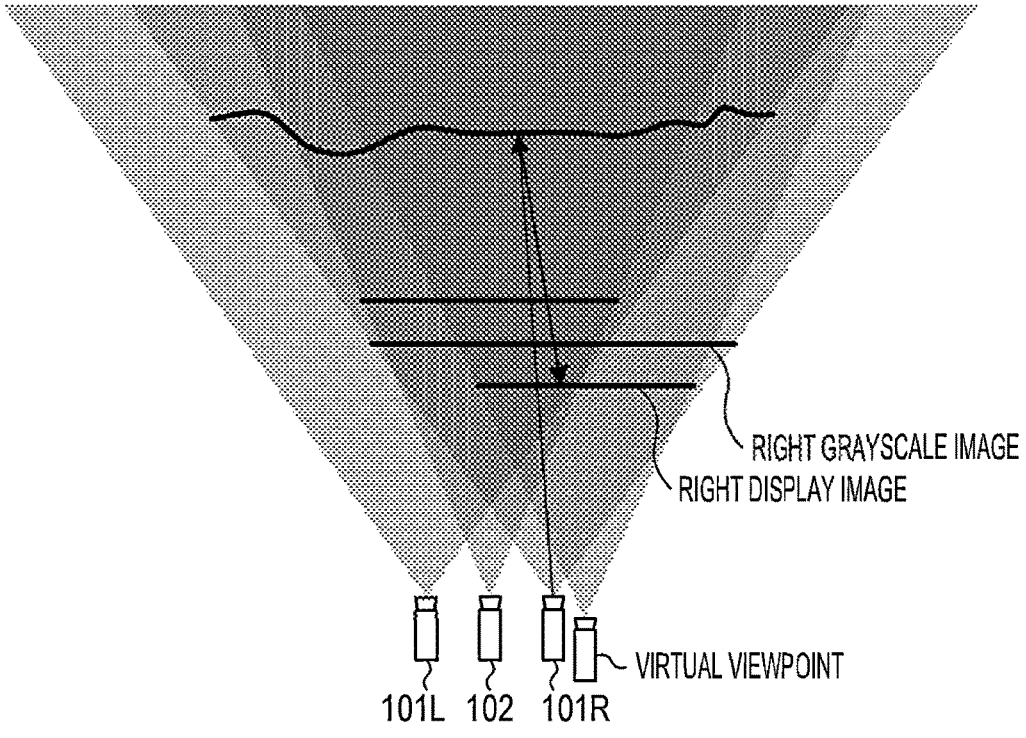

Furthermore, the coordinate conversion unit 202 projects the coordinates of the left grayscale image onto an image (display image, left display image) to be displayed on the left display unit 104L based on the depth map. This allows the coordinates of the left grayscale image to be associated with the coordinates of the left display image. Similarly, the coordinate conversion unit 202 projects the coordinates of the right grayscale image onto an image (display image, right display image) to be displayed on the right display unit 104R. This allows the coordinates of the right grayscale image to be associated with the coordinates of the right display image. This coordinate projection is shown in FIG. 3B. FIG. 3B shows the state in which the coordinates of the right grayscale image are projected onto the right display image. The coordinates of the left grayscale image are similarly projected onto the left display image.

Note that in the first embodiment, a left display image is generated that represents the view of the object from a position (a predetermined position, a virtual viewpoint) different from the position of the left imaging unit 101L and the position of the monocular camera 102. For example, a left display image is generated that represents the view of the object from a position directly facing the left display unit 104L (a position where the left eye is considered to be). Similarly, a right display image is generated that represents the view of the object from a position (a predetermined position, a virtual viewpoint) different from the position of the right imaging unit 101R and the position of the monocular camera 102. For example, a right display image is generated that represents the view of the object from a position directly facing the right display unit 104R (a position where the right eye is considered to be). The virtual viewpoint may be fixed or may be changeable by the user.

Since the positional relationship between the stereo camera 101 (the left imaging unit 101L and the right imaging unit 101R), the monocular camera 102, the left display unit 104L, and the right display unit 104R is known, the above-mentioned processing (association) is possible by using a depth map.

The combination unit 203 acquires grayscale images from the stereo camera 101, acquires captured color images from the monocular camera 102, and acquires the result of the above-mentioned association from the coordinate conversion unit 202. The combination unit 203 combines the pixel value of the pixel of the left grayscale image and the pixel value of the pixel of the captured color image corresponding to the pixel of the left grayscale image based on the result of the association from the coordinate conversion unit 202. In the first embodiment, the combination unit 203 combines the brightness value of the left grayscale image and the chromaticity value (value indicating chromaticity (hue and saturation)) of the captured color image. As a result, the pixel value of the pixel of the left display image corresponding to the pixel of the left grayscale image is determined, and a color image is generated as the left display image. Similarly, the combination unit 203 combines the pixel value of the pixel of the right grayscale image and the pixel value of the pixel of the captured color image corresponding to the pixel of the right grayscale image based on the result of the association from the coordinate conversion unit 202. In the first embodiment, the combination unit 203 combines the brightness value of the right grayscale image and the chromaticity value of the captured color image. As a result, the pixel value of the pixel of the right display image corresponding to the pixel of the right grayscale image is determined, and a color image is generated as the right display image.

The position/orientation estimation unit 204 estimates at least one of the position and orientation of the HMD 100 based on the grayscale image obtained by the stereo camera 101. This process can use various known techniques (for example, SLAM (Simultaneous Localization and Mapping)).

The drawing unit 205 draws (combines) graphics (for example, virtual objects) on the left display image as necessary and displays it on the left display unit 104L. Similarly, the drawing unit 205 draws graphics on the right display image as necessary and displays it on the right display unit 104R. The graphics are combined based on the estimation results from the position/orientation estimation unit 204, for example.

Figure 4:
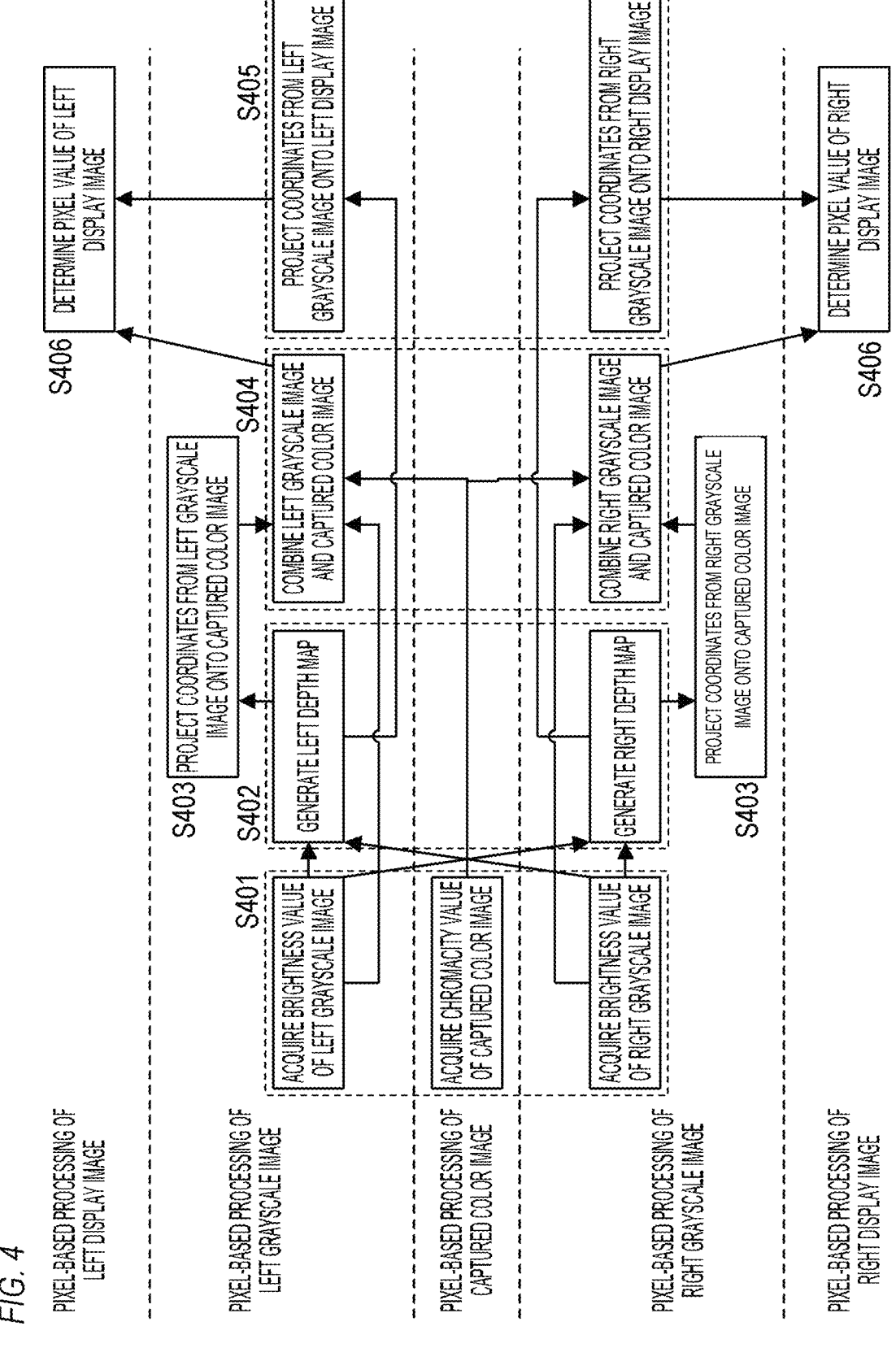
FIG. 4 is a data flow diagram of a display image generation process according to the first embodiment.

FIG. 4 is a data flow diagram of the display image generation process according to the first embodiment. Arrows indicate the flow of data. In FIG. 4, pixel-based processing of the left grayscale image, pixel-based processing of the right grayscale image, pixel-based processing of the captured color image, pixel-based processing of the left display image, and pixel-based processing of the right display image are shown separately. The display image generation process in FIG. 4 is realized by the CPU 106 expanding a program stored in the ROM 107 into the RAM 108 and executing it. For example, the display image generation process in FIG. 4 starts when the HMD 100 is started.

In step S401, the depth map generation unit 201 acquires a left grayscale image (brightness value of each pixel of the left grayscale image) and a right grayscale image (brightness value of each pixel of the right grayscale image) from the stereo camera 101. Furthermore, the combination unit 203 acquires a captured color image (chromaticity value of each pixel of the captured color image) from the monocular camera 102.

In step S402, the depth map generation unit 201 determines the depth corresponding to the pixels of the left grayscale image based on the left grayscale image and the right grayscale image acquired in step S401. The depth corresponding to the pixels of the left grayscale image is determined for each pixel of the left grayscale image. As a result, a left depth map indicating the depth for each pixel of the left grayscale image is generated. Similarly, the depth map generation unit 201 determines the depth corresponding to the pixels of the right grayscale image based on the left grayscale image and the right grayscale image acquired in step S401. The depth corresponding to the pixels of the right grayscale image is determined for each pixel of the right grayscale image. As a result, a right depth map indicating the depth for each pixel of the right grayscale image is generated.

In step S403, the coordinate conversion unit 202 projects the coordinates of each pixel of the left grayscale image onto the captured color image based on the left depth map generated in step S402. This allows the coordinates of each pixel of the left grayscale image to be associated with the coordinates of the captured color image. Similarly, the coordinate conversion unit 202 projects the coordinates of each pixel of the right grayscale image onto the captured color image based on the right depth map generated in step S402. This allows the coordinates of each pixel of the right grayscale image to be associated with the coordinates of the captured color image.

In step S404, the combination unit 203 combines the brightness value of a pixel of the left grayscale image with the chromaticity value of a pixel of the captured color image corresponding to the pixel of the left grayscale image. This process is performed for each pixel of the left grayscale image based on the association relationship obtained in step S403 (the association relationship between the coordinates of the left grayscale image and the coordinates of the captured color image). Similarly, the combination unit 203 combines the brightness value of a pixel in the right grayscale image with the chromaticity value of a pixel in the captured color image corresponding to the pixel in the right grayscale image. This process is performed for each pixel of the right grayscale image based on the association relationship obtained in step S403 (the association relationship between the coordinates of the right grayscale image and the coordinates of the captured color image).

In step S405, the coordinate conversion unit 202 projects the coordinates of each pixel of the left grayscale image onto the left display image based on the left depth map generated in step S402. This allows the coordinates of each pixel of the left grayscale image to be associated with the coordinates of the left display image. Similarly, the coordinate conversion unit 202 projects the coordinates of each pixel of the right grayscale image onto the right display image based on the right depth map generated in step S402. This allows the coordinates of each pixel of the right grayscale image to be associated with the coordinates of the right display image.

In step S406, the combination unit 203 determines the pixel value (pixel value after combination) obtained in step S405 for the pixel of the left grayscale image corresponding to the pixel of the left display image as the pixel value of the pixel in the left display image. This process is performed for each pixel of the left display image based on the association relationship obtained in step S403 (the association relationship between the coordinates of the left grayscale image and the coordinates of the left display image). Similarly, the combination unit 203 determines the pixel value (pixel value after combination) obtained in step S405 for the pixel of the right grayscale image corresponding to the pixel of the right display image as the pixel value of the pixel in the right display image. This process is performed for each pixel of the right display image based on the association relationship obtained in step S403 (the association relationship between the coordinates of the right grayscale image and the coordinates of the right display image).

As described above, according to the first embodiment, by using distance information, a suitable display image that represents a view close to the actual view can be obtained. For example, a display image that shows the view of the object from the position where the user's eyes are thought to be can be obtained. Furthermore, since the left imaging unit 101L and the right imaging unit 101R of the stereo camera 101 each use an imaging unit with lower performance than the monocular camera 102 in a certain perspective, it is possible to suppress an increase in processing load and device cost.

The imaging device for acquiring distance information is not limited to a stereo camera. For example, a ToF (Time of Flight) camera may be used as an imaging device (imaging unit) for acquiring distance information. In that case, the image captured by the ToF camera can be used as a depth map (distance information).

An example has been described in which two display images (left display image and right display image) corresponding to two images acquired by a stereo camera are generated separately, but the present invention is not limited to this. For example, the left display image may be generated by the above method, and the left display image may also be used as the right display image. In addition, only one of the left depth map and the right depth map may be generated, and the left display image and the right display image may be generated using the generated one depth map.

The imaging unit of the stereo camera does not have to be an imaging unit that obtains a grayscale image, and the monocular camera does not have to be an imaging unit that obtains a color image. For example, an imaging unit that obtains a color image may be used as each of the imaging unit of the stereo camera and the monocular camera. An imaging unit that obtains a color image may be used as the imaging unit of the stereo camera, and an imaging unit that obtains a grayscale image may be used as the monocular camera. The resolution of the image obtained by the monocular camera may be higher than the resolution of the image obtained by the imaging unit of the stereo camera. In that case, it is possible to generate a display image whose resolution is higher than the resolution of the image obtained by the imaging unit of the stereo camera based on the above-mentioned association relationship of coordinates.

The method of combining the pixel values of the image obtained by the imaging unit of the stereo camera and the pixel values of the image obtained by the monocular camera is not limited to the above method. For example, the chromaticity value of the image obtained by the imaging unit of the stereo camera may be taken into consideration, or the brightness value of the image obtained by the monocular camera may be taken into consideration. The pixel values of the image obtained by the monocular camera may be determined as the pixel values of the display image.

The image obtained by the imaging unit of the stereo camera may be an HDR (High Dynamic Range) image, the image obtained by the monocular camera may be an SDR (Standard Dynamic Range) image, and the display image may be an HDR image. If the image obtained by the imaging unit of the stereo camera is an HDR image, a depth map (distance information) can be obtained with stable accuracy. The image obtained by the imaging unit of the stereo camera may be an SDR image, the image obtained by the monocular camera may be an HDR image, and the display image may be an HDR image. By using an imaging unit that obtains an SDR image, the cost of the device can be reduced.

The virtual viewpoint is a position different from the position of the imaging unit of the stereo camera and the position of the monocular camera, but the present invention is not limited to this. For example, the position of the imaging unit of the stereo camera may be the virtual viewpoint. If a high-resolution color image can be displayed, a view close to the real view can be provided to the user. Therefore, when a high-resolution grayscale image is obtained by the imaging unit of the stereo camera, an image obtained by coloring the grayscale image obtained by the imaging unit may be used as the display image. When a low-resolution color image is obtained by the imaging unit of the stereo camera, an image obtained by increasing the resolution of the color image obtained by the imaging unit may be used as the display image. When a low-resolution grayscale image is obtained by the imaging unit of the stereo camera, an image obtained by coloring and increasing the resolution of the grayscale image obtained by the imaging unit may be used as the display image.

Second Embodiment

A second embodiment of the present invention will be described. Note that, in the following, a description of the same points as in the first embodiment (for example, the same configuration and processing as in the first embodiment) will be omitted, and differences from the first embodiment will be described.

In general, when acquiring a depth map (distance information), a highly accurate depth (distance) cannot be obtained for a portion of a grayscale image obtained by a stereo camera, namely the portion with no (few) features, for example, a portion with a uniform brightness value. Therefore, in the second embodiment, the projection unit 103 projects a pattern image of invisible light (for example, a dot pattern of infrared light). The stereo camera 101 can detect invisible light, and the projected pattern image appears in the grayscale image obtained by the stereo camera 101. For example, a highly accurate depth map can be obtained by considering the position and shape of the pattern image appearing in the grayscale image. In the example of a dot pattern, a highly accurate depth map can be obtained by considering the arrangement and spacing of a plurality of dots in the dot pattern appearing in the grayscale image. The projected pattern image does not appear in the color image obtained by the monocular camera 102.

However, if a grayscale image in which a pattern image appears is used, the pattern image will also appear in the display image. Therefore, in the second embodiment, the projection unit 103 repeats projection and non-projection of the pattern image (invisible light). The stereo camera 101 (each of the left imaging unit 101L and the right imaging unit 101R) repeatedly performs imaging to obtain a first grayscale image in which the pattern image appears and a second grayscale image in which the pattern image does not appear. Then, the CPU 106 determines a depth map from the first grayscale image and determines pixel values of the display image by combining pixel values of the second grayscale image and pixel values of the captured color image based on the depth map.

Figure 5:
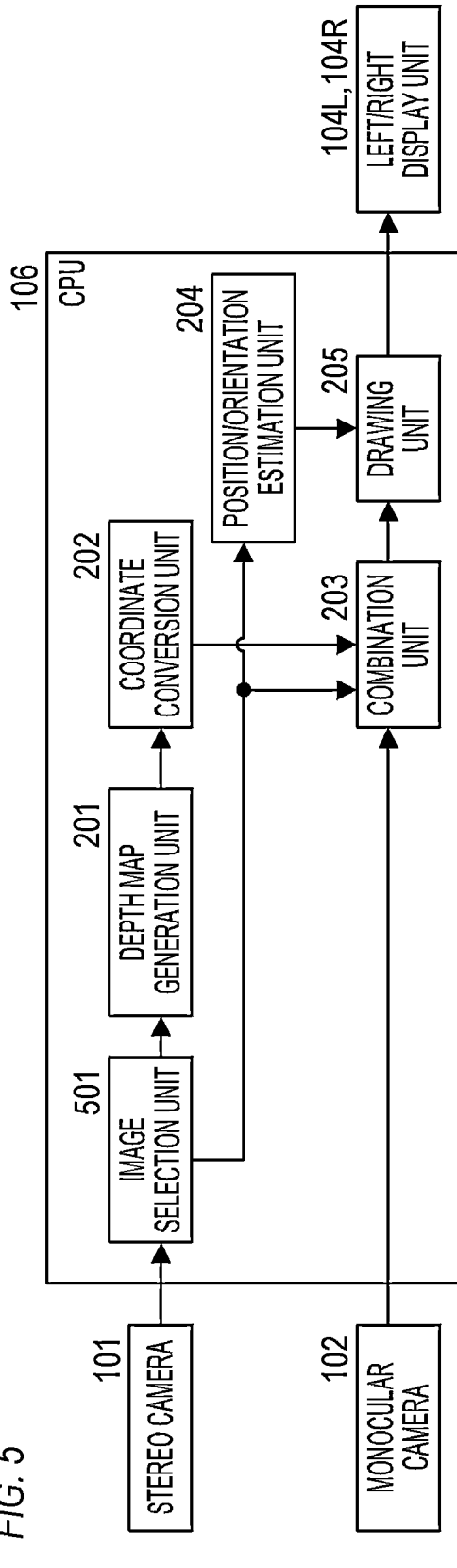
FIG. 5 is a block diagram showing the functional configuration of a CPU 106 according to a second embodiment.

FIG. 5 is a block diagram showing the functional configuration of the CPU 106 according to the second embodiment. In the second embodiment, the CPU 106 has a depth map generation unit 201, a coordinate conversion unit 202, a combination unit 203, a position/orientation estimation unit 204, a drawing unit 205, and an image selection unit 501.

The image selection unit 501 repeatedly acquires a left grayscale image and a right grayscale image from the stereo camera 101. The image selection unit 501 outputs the left grayscale image and the right grayscale image, which are the first grayscale image (grayscale image with a pattern image), to the depth map generation unit 201. Then, the image selection unit 501 outputs the left grayscale image and the right grayscale image, which are the second grayscale image (grayscale image without a pattern image), to the combination unit 203 and the position/orientation estimation unit 204.

Figure 6:
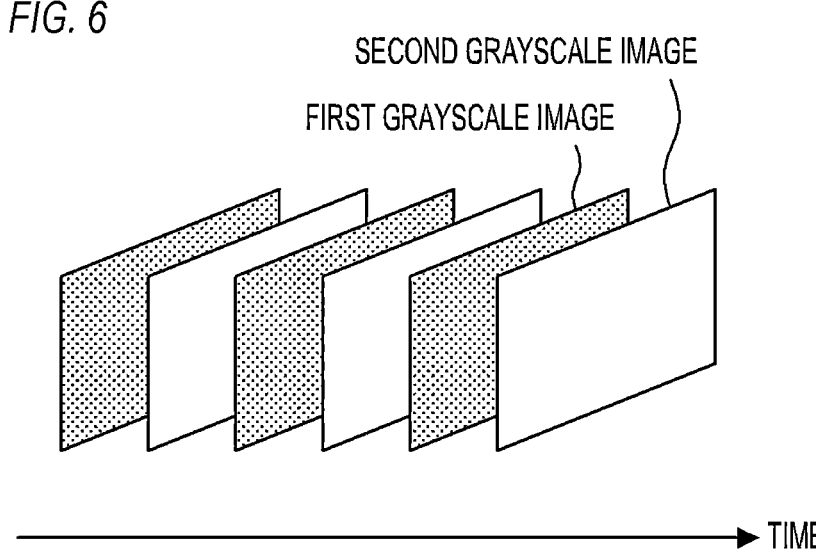
FIG. 6 is a diagram showing image acquisition by a stereo camera according to the second embodiment.

For example, as shown in FIG. 6, the stereo camera 101 acquires the first grayscale image and the second grayscale image alternately as the left grayscale image. Therefore, the image selection unit 501 acquires the first grayscale image and the second grayscale image alternately as the left grayscale image from the stereo camera 101. Similarly, the stereo camera 101 acquires the first grayscale image and the second grayscale image alternately as the right grayscale image. Therefore, the image selection unit 501 acquires the first grayscale image and the second grayscale image alternately as the right grayscale image from the stereo camera 101.

Note that although an example of alternately acquiring the first grayscale image of one frame and the second grayscale image of one frame has been described, the present invention is not limited to this. For example, the acquisition of the first grayscale image of one frame and the acquisition of the second grayscale image of a plurality of frames (for example, two frames, three frames, or five frames) may be performed alternately. Acquisition of the first grayscale image of a plurality of frames and acquisition of the second grayscale image of one frame may be performed alternately. Acquisition of the first grayscale image of a plurality of frames and acquisition of the second grayscale image of a plurality of frames may be performed alternately.

If the frequency of acquisition of the second grayscale image (grayscale image without a pattern image) is increased, the frame rate of the display image is also increased. Therefore, when the smoothness of the display image is prioritized, it is preferable to increase the frequency of acquiring the second grayscale image. If the frequency of acquiring the second grayscale image is increased, the frequency of acquiring the first grayscale image (grayscale image with a pattern image) will decrease. However, since the depth map can be updated based on changes in the grayscale image without using the first grayscale image, there is no problem, even if the frequency of acquiring the first grayscale image is low.

In the second embodiment, the frame rate of the display of the display image is lower than the frame rate of the imaging by the stereo camera 101 (each of the left imaging unit 101L and the right imaging unit 101R). For example, the frame rate of the display is 60 fps, 90 fps, or 120 fps, and the frame rate of the imaging is 90 fps, 120 fps, or 240 fps. The frame rate of the imaging by the monocular camera 102 may be matched to the frame rate of the display of the display image. Therefore, the stereo camera 101 (each of the left imaging unit 101L and the right imaging unit 101R) may capture images at a higher frame rate than the monocular camera 102.

As described above, according to the second embodiment, an image in which invisible light is captured is used to acquire (determine) distance information, and an image in which invisible light is not captured is used to determine the pixel values of a display image. In this way, it is possible to acquire highly accurate distance information while suppressing the appearance of invisible light in the display image. In addition, a more suitable display image (a suitable display image that represents a view closer to the actual view) can be obtained based on the highly accurate distance information.

Note that an image in which invisible light is captured may be used to acquire a depth map by stereo measurement, and an image in which invisible light is not captured may be used to acquire a position or orientation by SLAM.

A plurality of display modes that can be selectively set for the HMD 100 may include a display mode in which an image of the outside world (real space) is displayed on each of the left display unit 104L and the right display unit 104R and a display mode in which an image of the outside world is not displayed. The display mode in which an image of the outside world is displayed is, for example, an AR (Augmented Reality) mode. The display mode in which an image of the outside world is not displayed is, for example, a display mode in which an image of a virtual space is displayed on each of the left display unit 104L and the right display unit 104R. The display mode in which an image of a virtual space is displayed is, for example, a VR (Virtual Reality) mode.

The projection unit 103 may repeat projecting and not projecting invisible light when the AR mode is set and may continue to project invisible light when the AR mode is not set (for example, when the VR mode is set). By doing so, when the AR mode is not set, a highly accurate depth map (distance information) can be continuously acquired, and processing based on the depth map can be suitably performed.

When the AR mode is not set (for example, when the VR mode is set), the stereo camera 101 (each of the left imaging unit 101L and the right imaging unit 101R) may capture images at a frame rate lower than when the AR mode is set. For example, when the AR mode is not set, the stereo camera 101 may capture images so that the frequency of capturing images in which invisible light is captured is reduced. The stereo camera 101 may capture images so that only images in which invisible light is captured are captured. By doing so, the power consumption of the HMD 100 can be reduced.

Third Embodiment

A third embodiment of the present invention will be described. Note that, in the following, a description of the same points as in the first embodiment (for example, the same configuration and processing as in the first embodiment) will be omitted, and differences from the first embodiment will be described.

Figure 7:
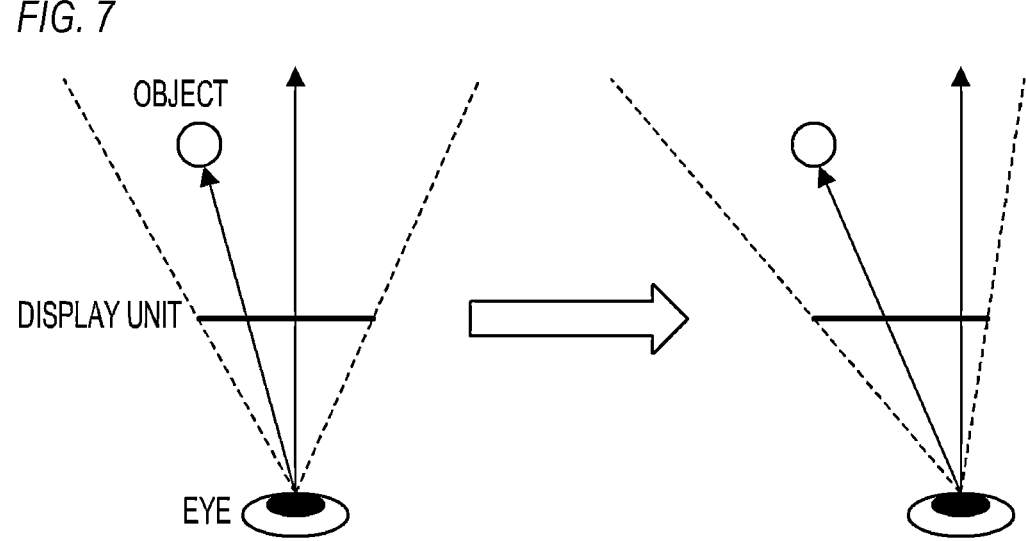
FIG. 7 is a diagram showing the positional relationship between a display unit, the eyes, and the object according to a third embodiment.

The eye position of the user wearing the HMD 100 (the relative position of the left eye with respect to the left display unit 104L and the relative position of the right eye with respect to the right display unit 104R), that is, the actual viewpoint, depends on the user. As shown in FIG. 7, when the relative position of the user's eyes with respect to the display unit changes, the relative position of the object with respect to the eyes changes even if the relative position of the object with respect to the display unit does not change, and the image to be displayed on the display unit changes. Therefore, in the third embodiment, the CPU 106 determines the viewpoint of the left eye (the relative position of the left eye with respect to the left display unit 104L) based on the image of the left eye (left-eye image) captured by the left-eye imaging unit 105L and generates a left display image that represents the view of the object from that viewpoint. Similarly, the CPU 106 determines the viewpoint of the right eye (the relative position of the right eye with respect to the right display unit 104R) based on the image of the right eye (right-eye image) captured by the right-eye imaging unit 105R and generates a right display image that represents the view of the object from that viewpoint.

The human eye has the characteristics that it can detect colors in the central visual field with good sensitivity but cannot detect colors in the peripheral visual field with good sensitivity. Therefore, in the third embodiment, the CPU 106 processes a portion of the left display image corresponding to the central visual field of the left eye differently from a portion of the left display image corresponding to the peripheral visual field of the left eye based on the left-eye image. The CPU 106 determines the pixel values of the portion of the left display image corresponding to the central visual field of the left eye by combining the pixel values of the left grayscale image and the pixel values of the captured color image, as in the first embodiment. However, the CPU 106 determines the pixel values of the portion of the left display image corresponding to the peripheral visual field of the left eye from the pixel values of the left grayscale image. As a result, only the portion of the left display image corresponding to the central visual field of the left eye is colored, and the pixel values of the portion of the left display image corresponding to the peripheral visual field of the left eye correspond to grayscale pixel values.

Similarly, the CPU 106 processes a portion of the right display image corresponding to the central visual field of the right eye differently from a portion of the right display image corresponding to the peripheral visual field of the right eye based on the right-eye image. The CPU 106 determines the pixel value of the portion of the right display image corresponding to the central visual field of the right eye by combining the pixel value of the right grayscale image with the pixel value of the captured color image, as in the first embodiment. However, the CPU 106 determines the pixel value of the portion of the right display image corresponding to the peripheral visual field of the right eye from the pixel value of the right grayscale image. As a result, only the portion of the right display image corresponding to the central visual field of the right eye is colored, and the pixel values of the portion corresponding to the peripheral visual field of the right eye correspond to grayscale pixel values.

Figure 8:
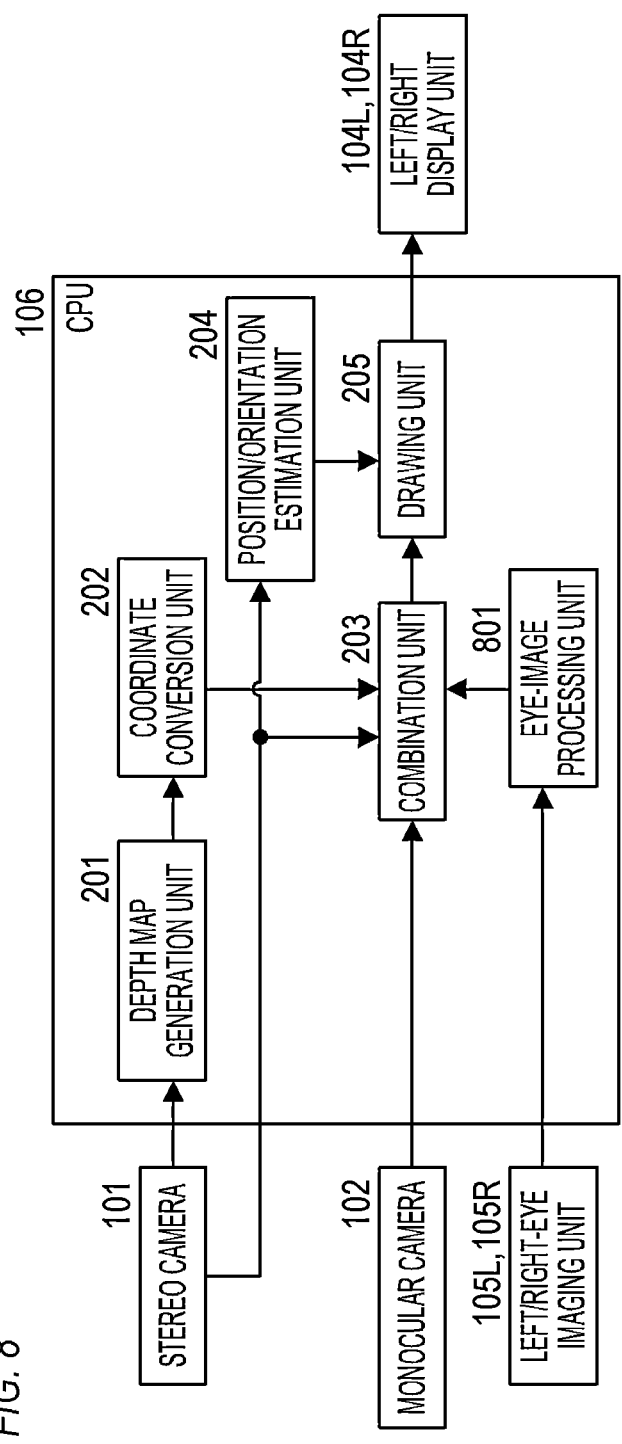
FIG. 8 is a block diagram showing the functional configuration of the CPU 106 according to the third embodiment.

FIG. 8 is a block diagram showing the functional configuration of the CPU 106 according to the third embodiment. In the third embodiment, the CPU 106 has a depth map generation unit 201, a coordinate conversion unit 202, a combination unit 203, a position/orientation estimation unit 204, a drawing unit 205, and an eye-image processing unit 801.

The eye-image processing unit 801 acquires a left-eye image from the left-eye imaging unit 105L and performs processing using the left-eye image. For example, the eye-image processing unit 801 detects the left eye from the left-eye image and determines the viewpoint of the left eye (the relative position of the left eye with respect to the left display unit 104L). The eye-image processing unit 801 also acquires gaze information related to the gaze of the left eye based on the left-eye image (gaze detection). The gaze information includes, for example, at least one of the angle information indicating the direction of the gaze and the position information indicating the position of the gaze on the display surface of the left display unit 104L. Similarly, the eye-image processing unit 801 acquires a right-eye image from the right-eye imaging unit 105R and performs processing using the right-eye image. Various known techniques can be used for the processing of the eye-image processing unit 801. For example, a plurality of light sources can be provided around the left-eye imaging unit 105L and gaze information can be acquired based on the positional relationship between a plurality of corneal reflection images corresponding to the plurality of light sources and the pupil.

The processing of the combination unit 203 is generally the same as that of the first embodiment. However, the left display image is generated based on the viewpoint of the left eye, namely, not a predetermined virtual viewpoint, but the viewpoint of the left eye determined by the eye-image processing unit 801. In addition, based on the gaze information of the left eye acquired by the eye-image processing unit 801, a left display image is generated in which only a portion corresponding to the central visual field of the left eye is colored, and the pixel values of the portion corresponding to the peripheral visual field of the left eye correspond to grayscale pixel values. Similarly, the right display image is generated based on the viewpoint of the right eye, namely, not a predetermined virtual viewpoint, but the viewpoint of the right eye determined by the eye-image processing unit 801. In addition, based on the gaze information of the right eye acquired by the eye-image processing unit 801, a right display image is generated in which only a portion corresponding to the central visual field of the right eye is colored, and the pixel values of the portion corresponding to the peripheral visual field of the right eye correspond to grayscale pixel values.

Figure 9:
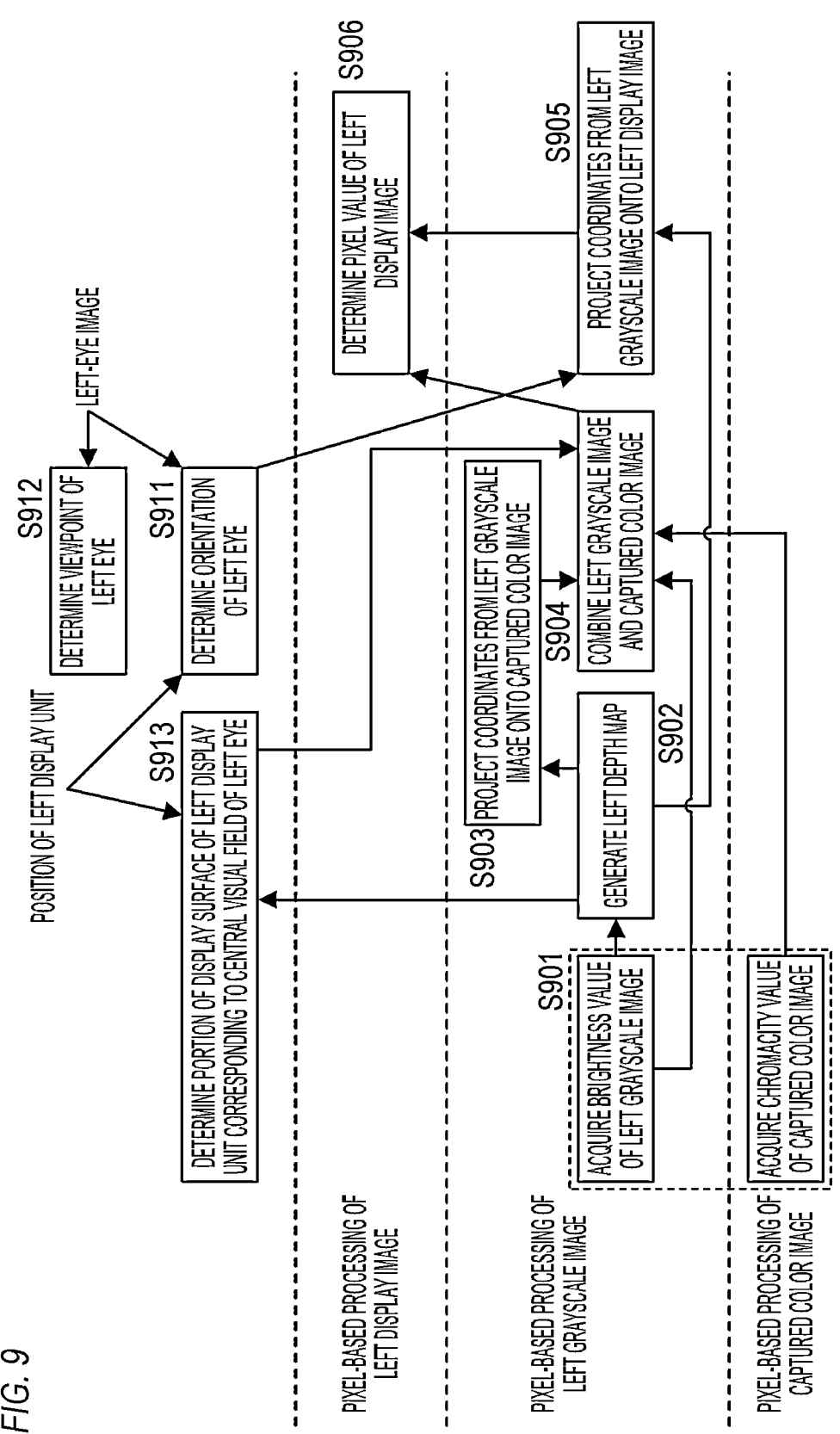
FIG. 9 is a data flow diagram of the display image generation process according to the third embodiment.

FIG. 9 is a data flow diagram of the display image generation process according to the third embodiment. Arrows indicate the flow of data. In FIG. 9, pixel-based processing of the left grayscale image, pixel-based processing of the captured color image, and pixel-based processing of the left display image are shown separately. The display image generation process in FIG. 9 is realized by the CPU 106 expanding a program stored in the ROM 107 into the RAM 108 and executing it. For example, the display image generation process in FIG. 9 starts when the HMD 100 is started. Note that the method of generating the right display image is the same as the method of generating the left display image, so the description of the method of generating the right display image is omitted.

The processes in steps S901 to S903 are the same as the processes in steps S401 to S403 in the first embodiment (FIG. 4).

In step S911, the eye-image processing unit 801 detects the position of the left eye from the left-eye image obtained by the left-eye imaging unit 105L and determines the viewpoint of the left eye (the relative position of the left eye with respect to the left display unit 104L).

In step S912, the eye-image processing unit 801 determines the orientation (direction of gaze) of the left eye based on the left-eye image.

In step S913, the coordinate conversion unit 202 determines a portion of the display surface of the left display unit 104L that corresponds to the central visual field of the left eye based on the orientation of the left eye determined in step S912. For example, the coordinate conversion unit 202 determines a portion that corresponds to a predetermined viewing angle centered on the direction of the gaze of the left eye as the portion that corresponds to the central visual field. The predetermined viewing angle is, for example, a viewing angle of 30 degrees or more and 50 degrees or less. Then, the coordinate conversion unit 202 projects a portion of the display surface of the left display unit 104L that corresponds to the central visual field of the left eye onto the left grayscale image based on the left depth map generated in step S902. In this way, a portion of the left grayscale image that corresponds to the central visual field of the left eye is determined.

In step S904, similar to step S404 in the first embodiment (FIG. 4), the combination unit 203 combines the brightness value of a pixel in the left grayscale image with the chromaticity value of a pixel in the captured color image corresponding to the pixel in the left grayscale image. However, the process of step S904 is performed only for the portion determined in step S913 (the portion of the left grayscale image corresponding to the central visual field of the left eye).

In step S905, similar to step S405 in the first embodiment (FIG. 4), the coordinate conversion unit 202 projects the coordinates of each pixel in the left grayscale image onto the left display image. However, the coordinate conversion unit 202 performs the projection based on the viewpoint of the left eye determined in step S911, not on a predetermined virtual viewpoint.

The process of step S906 is the same as step S406 in the first embodiment (FIG. 4). However, as described above, the process of step S904 is performed only on the portion of the left grayscale image that corresponds to the central visual field of the left eye. Therefore, the process of step S906 generates a left display image in which only the portion that corresponds to the central visual field of the left eye is colored, and the pixel values of the portion that corresponds to the peripheral visual field of the left eye correspond to grayscale pixel values.

As described above, according to the third embodiment, the user's viewpoint is determined based on an image of the user's eyes. Then, a display image that represents the view of the object from the determined viewpoint is generated. In this way, it is possible to obtain a more suitable display image (a suitable display image that represents a view closer to the actual view). Furthermore, pixel values are combined only for the portion that corresponds to the user's central visual field. In this way, it is also possible to obtain a more suitable display image (a suitable display image that represents a view closer to the actual view). By limiting the portion where pixel values are combined, the processing load can also be reduced.

Note that gaze detection does not need to be performed. In that case, for example, the CPU 106 determines the pixel value of the central portion of the left display image by combining the pixel value of the left grayscale image and the pixel value of the captured color image. Then, the CPU 106 determines pixel values of the peripheral portion (portion other than the central portion) of the left display image from pixel values of the left grayscale image. Similarly, the CPU 106 determines pixel values of the central portion of the right display image by combining pixel values of the right grayscale image and pixel values of the captured color image. Then, the CPU 106 determines pixel values of the peripheral portion (portion other than the central portion) of the right display image from pixel values of the right grayscale image. In this way, it is also possible to obtain a more suitable display image (a suitable display image that represents a view closer to the actual view). Taking into consideration the range in which the user's gaze changes, a portion wider than the central visual field may be predetermined as the central portion. The central portion may be fixed or may be changeable by the user.

Generally, in acquiring a depth map (distance information), it is not possible to obtain a highly accurate depth (distance) for the peripheral portion of the image. Therefore, processing based on the depth map may not be performed suitably in the peripheral portion. For example, when coloring the peripheral portion of the grayscale image, a misalignment between the color and the object may occur. According to the above configuration in which pixel values are not combined for the peripheral portion, the occurrence of such a problem can be suppressed.

Fourth Embodiment

A fourth embodiment of the present invention will be described. Note that, in the following, a description of the same points as in the first embodiment (for example, the same configuration and processing as in the first embodiment) will be omitted, and differences from the first embodiment will be described. In the following, matters related to the right eye will be described. Matters related to the left eye are similar to those related to the right eye, so the description of matters related to the left eye will be omitted.

When acquiring a depth map (distance information), it may be impossible to acquire depth (distance) for some positions in the display image. In the fourth embodiment, the CPU 106 (the combination unit 203) determines pixel values for such positions by interpolation.

For example, a position visible from the right eye (viewpoint) may be hidden by the right imaging unit 101R and not appear in the right grayscale image. In such a case, for a position in the right display image that is not shown in the right grayscale image, depth (distance) cannot be acquired, and pixel values cannot be determined. This state is shown in FIG. 10.

Figure 11:
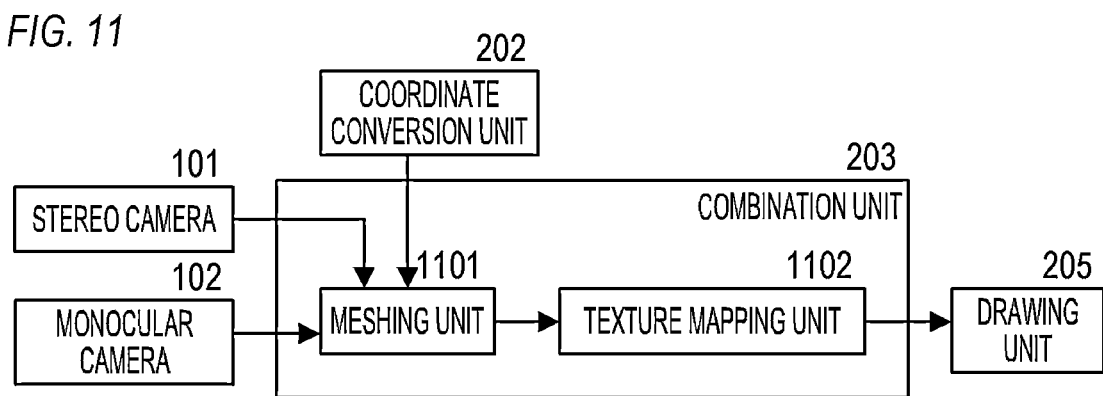
FIG. 11 is a diagram showing the configuration of a combination unit according to the fourth embodiment.

The configuration of the combination unit 203 for solving such a first problem is shown in FIG. 11. In FIG. 11, the combination unit 203 has a meshing unit 1101 and a texture mapping unit 1102. The combination unit 203 in FIG. 11 also performs the same process (combination of pixel values) as the combination unit 203 in the first embodiment.

Figure 10:
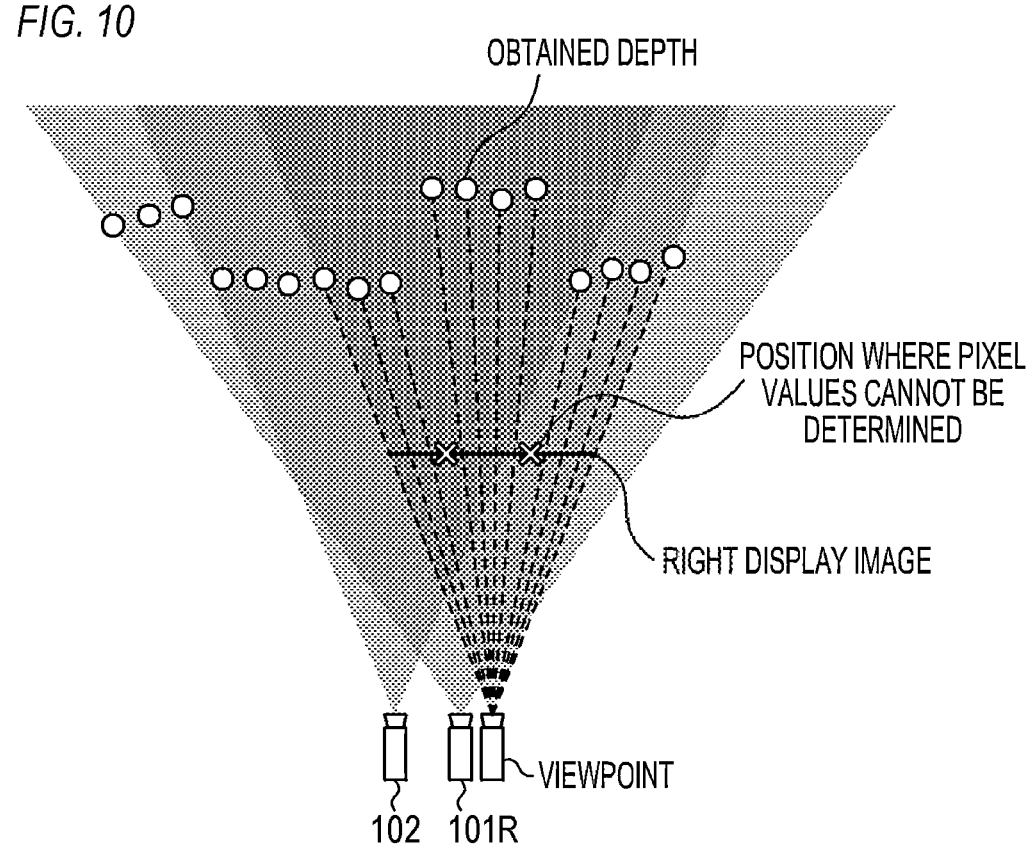
FIG. 10 is a diagram showing a situation in which interpolation is required according to a fourth embodiment.

The meshing unit 1101 sets a plurality of regions whose vertices are the positions of the right grayscale image or the captured color image whose depth (distance) is indicated by the depth map (distance information) (meshing in FIG. 10).

The texture mapping unit 1102 performs texture mapping using a plurality of textures corresponding to the plurality of regions set by the meshing unit 1101. In this way, the pixel values of positions in the right display image whose depth is not indicated by the depth map are determined. In the fourth embodiment, a plurality of regions of the right grayscale image after the combination of pixel values, that is, a plurality of regions of the colored right grayscale image, are used as a plurality of textures.

Note that a plurality of regions of the captured color image may be used as a plurality of textures. The number of a plurality of positions (a plurality of vertices) used for meshing may be the same as the number of pixels in the right grayscale image or may be less than the number of pixels in the right grayscale image. By reducing the number of a plurality of positions used for meshing, the processing load can be reduced. The interpolation method is not limited to the above method. For example, without performing texture mapping, the depth value may be interpolated so that the pixel value of an undetermined position (a position where the pixel value is not determined) of the display image can be determined in the same manner as the pixel value of a determined position (a position where the pixel value is determined). After obtaining a right display image in which some pixel values have not been determined, the pixel value of the undetermined position may be determined by an interpolation process (for example, linear interpolation) using pixel values around the undetermined position of the right display image.

Figure 12:
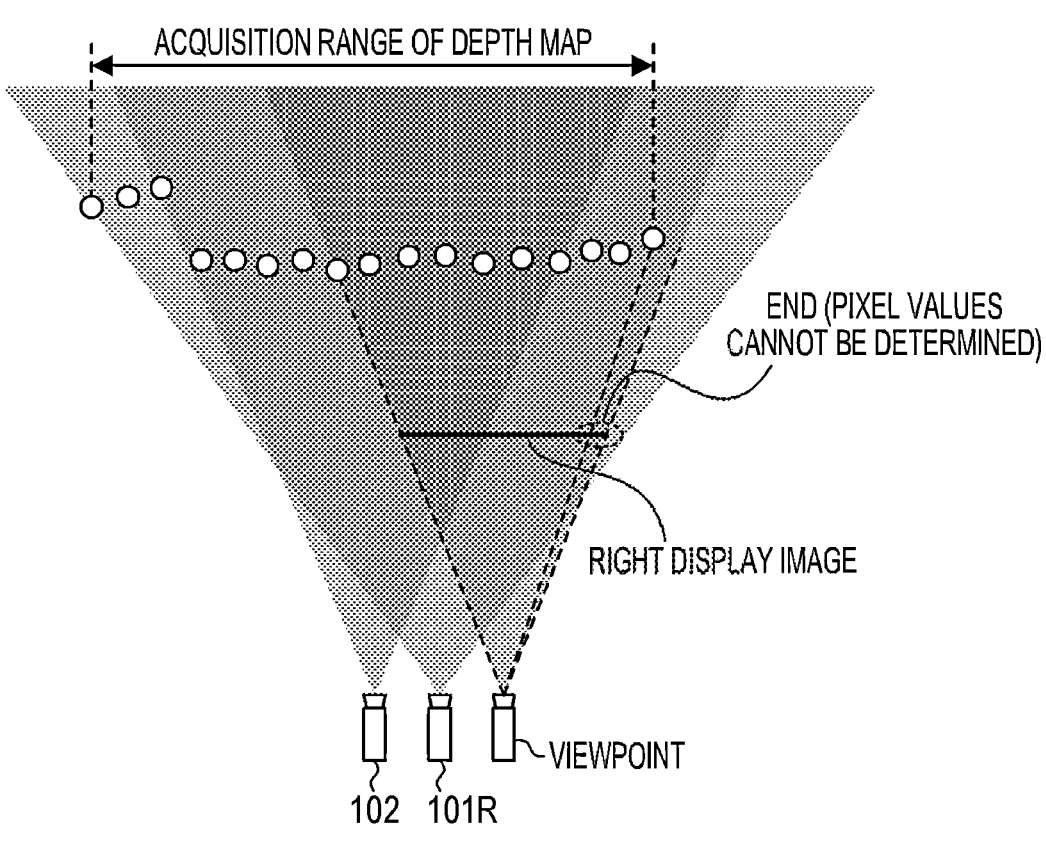
FIG. 12 is a diagram showing a situation in which interpolation is required according to the fourth embodiment.

In addition, as shown in FIG. 12, the end of the range corresponding to the right display image may be outside the acquisition range of the depth map (the range where the imaging range of the left imaging unit 101L and the imaging range of the right imaging unit 101R overlap). In such a case, the depth cannot be acquired for the end of the right display image, and the pixel value cannot be determined.

Figure 13:
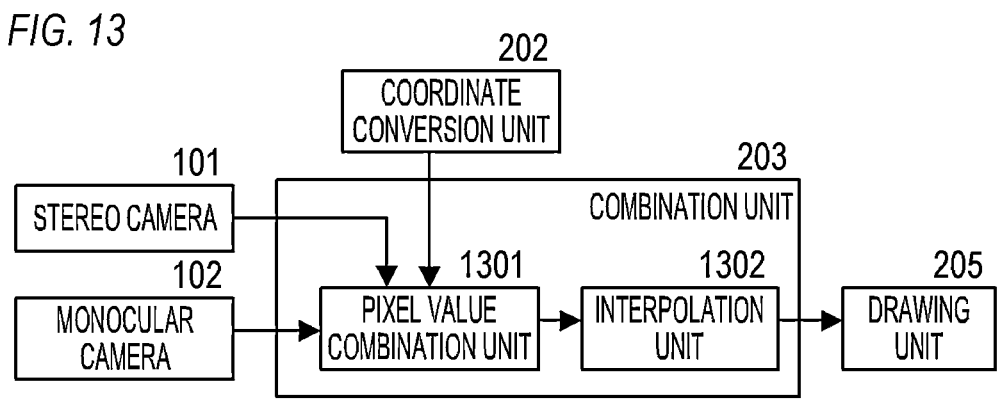
FIG. 13 is a diagram showing the configuration of the combination unit according to the fourth embodiment.

The configuration of the combination unit 203 for solving such a second problem is shown in FIG. 13. In FIG. 13, the combination unit 203 has a pixel value combination unit 1301 and an interpolation unit 1302.

The pixel value combination unit 1301 performs the same process (combination of pixel values) as the combination unit 203 of the first embodiment. In addition, the pixel value combination unit 1301 generates a mask image that represents an undetermined area (an area where pixel values have not been determined) of the right display image.

The interpolation unit 1302 performs an inpainting process on the right display image generated by the pixel value combination unit 1301. When the right display image generated by the pixel value combination unit 1301 is an incomplete right display image including an undetermined region, the pixel values of the undetermined region are determined by inpainting, and a complete right display image is generated. Various known techniques can be used for inpainting. The interpolation unit 1302 is, for example, a calculator (trained model) that performs inpainting using AI (Artificial Intelligence), such as, for example, GAN (Generative Adversarial Network). In the fourth embodiment, the right display image and the mask image generated by the pixel value combination unit 1301 are input to the interpolation unit 1302, and a complete right display image is output from the interpolation unit 1302.

The first problem can also be solved by using the combination unit 203 in FIG. 13.

As described above, according to the fourth embodiment, a complete display image is generated by interpolation. In this way, it is possible to obtain a more suitable display image (a suitable display image that represents a view closer to the real view).

Note that the combination unit 203 may generate a display image with a portion colored by combining pixel values and color other portions of the display image based on the result of coloring the portion. In order to color the other portions, a calculator (trained model) that uses AI (for example, GAN) to perform coloring can be used. For example, the calculator receives input of the display image with the colored portion and a mask image that represents the color distribution of the portion and outputs a complete display image.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The above-mentioned embodiments (including the variation) are only examples, and configurations obtained by deforming or changing the above-mentioned configuration as appropriate within a scope of the gist of the present invention are also included in the present invention. The configurations obtained by combining the above-mentioned configurations as appropriate are also included in the present invention.

According to the present invention, an image suitable for display on a head-mounted display device can be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing device usable together with a head-mounted display device including (a) stereo camera configured to obtain distance information, (b) a monocular camera different from the stereo camera, (c) a left display, and (d) a right display, the image processing device comprising:

one or more processors and/or circuitry configured to (1) execute first acquisition processing to acquire a left grayscale image of an outside world and a right grayscale image of an outside world, the left grayscale image and the right grayscale image having been captured by the stereo camera;

(2) execute second acquisition processing to acquire a color image of the outside world, the second color image having been captured by the monocular camera; and (3) execute generation processing to (a) generate a left color image of the outside world to be displayed on the left display, by coloring the left grayscale image using color information of the color image, after associating the left grayscale image with the color image on a basis of the distance information obtained by the stereo camera, and (b) generate a right color image of the outside world to be displayed on the right display, by coloring the right grayscale image using the color information of the color image, after associating the right grayscale image with the color image on a basis of the distance information obtained by the stereo camera.

2. The image processing device according to claim 1, wherein in the generation processing, the left color image of the outside world and the right color image of the outside world are generated by, after associating pixels of the left grayscale image and pixels of the right grayscale image with pixels of the color image on a basis of the distance information obtained by the stereo camera, (1) combining pixel values of the left grayscale image and pixel values of the color image and (2) combining pixel values of the right grayscale image and pixel values of the color image.

3. The image processing device according to claim 2, wherein in the generation processing, (1) the left color image of the outside world is generated by combining brightness values of the left grayscale image and chromaticity values of the color image, and (2) the right color image of the outside world is generated by combining brightness values of the right grayscale image and chromaticity values of the color image.

4. The image processing device according to claim 3, wherein in the generation processing, the left color image of the outside world and the right color image of the outside world are generated by using a trained model.

5. The image processing device according to claim 1, wherein the stereo camera includes an image sensor.

6. The image processing device according to claim 5, wherein the monocular camera includes an image sensor.

7. The image processing device according to claim 6, wherein the stereo camera includes a left image sensor and a right image sensor, and wherein the monocular camera is disposed between the left image sensor and the right image sensor.

8. The image processing device according to claim 1, wherein in the generation processing, (1) a display image to be displayed on the left display is generated by combining a graphic and the left color image of the outside world, and (2) a display image to be displayed on the right display is generated by combining a graphic and the right color image of the outside world.

9. The image processing device according to claim 8, wherein the one or more processors and/or circuitry further executes an estimation processing to estimate at least one of a position and an orientation of the head-mounted display device, and wherein in the generation processing, the graphic is generated on a basis of at least one of the position and the orientation.

10. The image processing device according to claim 9, wherein in the estimation processing, at least one of the position and the orientation is estimated on a basis of the left grayscale image and/or the right grayscale image.

11. The image processing device according to claim 1, wherein a resolution of the color image is higher than a resolution of the left grayscale image and a resolution of the right grayscale image, and wherein in the generation processing, (1) the left color image of the outside world of which a resolution is higher than the resolution of the left grayscale image is generated, and (2) the right color image of the outside world of which a resolution is higher than the resolution of the right grayscale image is generated.

12. The image processing device according to claim 1, wherein the stereo camera includes an image sensor that is a global shutter-type image sensor, and wherein the monocular camera includes an image sensor that is a rolling shutter-type image sensor.

13. The image processing device according to claim 1, wherein the stereo camera performs imaging at a frame rate higher than a frame rate of the monocular camera.

14. The image processing device according to claim 1, wherein each of the left grayscale image and the right grayscale image is an SDR image, wherein the color image is an HDR image, and wherein in the generation processing, the left color image of the outside world and the right color image of the outside world, each of which is an HDR image, are generated.

15. The image processing device according to claim 1, wherein the head-mounted display device further includes a projector configured to project invisible light, and wherein the distance information is generated on a basis of the left grayscale image and/or the right grayscale image, in each of which the invisible light is captured.

16. The image processing device according to claim 15, wherein in the generation processing, (1) the left color image of the outside world is generated by combining the left grayscale image in which the invisible light is not captured and the color image, and (2) the right color image of the outside world is generated by combining the right grayscale image in which the invisible light is not captured and the color image.

17. The image processing device according to claim 1, wherein in the generation processing, (1) the left color image of the outside world representing a view from a position which is different from a position of the stereo camera and which is different from a position of the monocular camera and (2) the right color image of the outside world representing a view from a position which is different from a position of the stereo camera and which is different from a position of the monocular camera are generated on a basis of the distance information obtained by the stereo camera.

18. The image processing device according to claim 1, wherein the head-mounted display device further includes an eye image sensor configured to capture an eye of a user wearing the head-mounted display device, and wherein in the generation processing, (1) the left color image of the outside world that represents a view from a position based on an image of the eye captured by the eye image sensor and (2) the right color image of the outside world that represents a view from a position based on the image of the eye captured by the eye image sensor are generated.

19. A head-mounted display device comprising:

the stereo camera configured to obtain the distance information;

the monocular camera different from the stereo camera;

the left display;

the right display; and the image processing device according to claim 1.

20. A control method of an image processing device usable together with a head-mounted display device, the head-mounted display device including (a) a stereo camera configured to obtain distance information, (b) a monocular camera different from the stereo camera, (c) a left display, and (d) a right display, the control method comprising:

acquiring a left grayscale image of an outside world and a right grayscale image of an outside world, the left grayscale image and the right grayscale image having been captured by the stereo camera;

acquiring a color image of the outside world, the second color image having been captured by the monocular camera;

generating a left color image of the outside world to be displayed on the left display, by coloring the left grayscale image using color information of the color image, after associating the left grayscale image with the color image on a basis of the distance information obtained by the stereo camera; and generating a right color image of the outside world to be displayed on the right display, by coloring the right grayscale image using color information of the color image, after associating the right grayscale image with the color image on a basis of the distance information obtained by the stereo camera.

21. A non-transitory computer-readable medium that stores a program, wherein the program causes a computer to execute a control method of an image processing device usable together with a head-mounted display device, the head-mounted display device including (a) stereo camera configured to obtain distance information, (b) a monocular camera different from the stereo camera, (c) a left display, and (d) a right display, the control method comprising:

acquiring a left grayscale image of an outside world and a right grayscale image of an outside world, the left grayscale image and the right grayscale image having been captured by the stereo camera;

acquiring a color image of the outside world, the color image having been captured by the monocular camera;

generating a left color image of the outside world to be displayed on the left display, by coloring the left grayscale image using color information of the color image, after associating the left grayscale image with the color image on a basis of the distance information obtained by the stereo camera; and generating a right color image of the outside world to be displayed on the right display, by coloring the right grayscale image using color information of the color image, after associating the right grayscale image with the color image on a basis of the distance information obtained by the stereo camera.

* * * * *